Patented Feb. 5, 1952

2,584,627

UNITED STATES PATENT OFFICE 2,584,627

STABILIZED VITAMIN B$_{12}$ COMPOSITION

Helen R. Skeggs, Philadelphia, Pa., assignor to Sharp & Dohme, Incorporated, Philadelphia, Pa., a corporation of Maryland No Drawing. Application August 9, 1950,
Serial No. 178,555

3 Claims. (Cl. 167—81)

This invention relates to medicinal preparations, and more particularly to a composition containing vitamin B$_{12}$ or members of the vitamin B$_{12}$ complex.

It is now generally recognized that vitamin B$_{12}$ is an important nutritional factor. It is administered, generally parenterally, to persons suffering with pernicious anemia. The vitamin is recovered and stored in containers, such as ampuls, for use for administration when necessary.

In its pure crystalline form, vitamin B$_{12}$ is quite stable. However, difficulty has been experienced with maintaining stability of partially purified vitamin B$_{12}$ concentrates during storage. Thus, it has been found that concentrates having vitamin B$_{12}$ activity which are stored in sealed ampuls lose a considerable portion of their potency upon standing. For example, a solution which has a potency of 12.5 micrograms per milliliter by microbiological assay when prepared, will have a potency of only 3.5 micrograms per milliliter after a storage period at room temperatures for six months.

Although the purified vitamin B$_{12}$ is stable, it is desired, from a commercial viewpoint, to use concentrates having vitamin B$_{12}$ activity because of the relatively low cost of the latter partially purified material. Therefore, it has been recognized that a stabilized vitamin B$_{12}$ concentrate would be of value.

In accordance with the present invention, vitamin B$_{12}$ concentrates are stabilized by the addition thereto of saccharated iron oxide. As a further feature of the invention, this iron compound has the additional advantage that it is a valuable therapeutic agent in the treatment of anemia. Moreover, this iron compound has been found to be available for hemoglobin production upon parenteral administration. Therefore the present invention not only provides a composition in which the vitamin B$_{12}$ present in concentrates is itself stabilized for prolonged periods, but which also supplies iron in a beneficial form.

In preparing the composition contemplated by the invention, it is merely necessary to mix together an aqueous solution of vitamin B$_{12}$ concentrates and the saccharated iron oxide. This mixture is then stored in sealed containers, such as ordinary ampuls.

Representative examples of the invention are the following:

*Example 1*

25 milligrams of a vitamin B$_{12}$ concentrate having a potency of 10.3 micrograms per milligram were dissolved in 12.5 ml. of distilled water at room temperature, by shaking. A saccharated iron oxide solution was prepared by dissolving 200 milligrams of commercially available saccharated ferric oxide in a small amount of pyrogen-free distilled water, enough water then being added to bring it up to a final amount of 10 cc.

To 1 ml. of the vitamin B$_{12}$ concentrate solution was added 1 ml. of the saccharated iron oxide solution. One ml. of this mixture had a potency of 10.3 micrograms. This mixture was placed in a pressurized and heated chamber having a temperature of 121° C. for 15 minutes, as this had been found to compare with storage of the composition under normal room temperature for a period of six months. At the end of this time it was found that the composition contained the same 10.3 micrograms per ml. of vitamin B$_{12}$ activity. A similar batch of vitamin B$_{12}$ concentrate solution which did not contain the saccharated iron compound had only 6.1 mcg./ml. at the end of this same storage time.

*Example 2*

One ml. of the stock vitamin B$_{12}$ solution of Example 1 was mixed with two cc. of the stock saccharated iron oxide solution. One ml. of this had a potency of 6.9 micrograms. After the same artificial aging treatment, one ml. had a potency of 7.6 micrograms. This increase is within the range of precision of the assay methods employed.

*Example 3*

One ml. of the stock vitamin B$_{12}$ solution of Example 1 was mixed with three cc. of the stock saccharated iron oxide solution. One ml. of this had a potency of 5.1 micrograms. After the same artificial aging treatment, one ml. had a potency of 5.4 micrograms.

*Example 4*

One ml. of the stock vitamin B$_{12}$ solution of Example 1 was mixed with 0.1 ml. of the stock saccharated iron oxide solution. One ml. of this had a potency of 20.5 micrograms. After the same artificial aging treatment, one ml. had a potency of 18.3 micrograms.

*Example 5*

One ml. of the stock vitamin B$_{12}$ solution of Example 1 was mixed with 4.0 ml. of the stock saccharated iron oxide solution. One ml. of this had a potency of 4.1 micrograms. After the same artificial aging treatment, one ml. had a potency of 4.8 micrograms.

These examples show that an amount of saccharated iron oxide at least as great as that in 0.1 ml. of the stock solution of Example 1, mixed with 1.0 ml. of the stock solution of vitamin $B_{12}$ concentrate of Example 1, will produce satisfactory stability of the vitamin $B_{12}$ activity. Amounts in excess of 4.0 ml. of the saccharated iron oxide solution per 1.0 ml. of the vitamin $B_{12}$ solution may be employed and still obtain satisfactory stability, but amounts greater than this 4.0 ml. are not commercially advisable because of the expense involved. The ratio set forth in Example 1 is preferred.

It will be understood that the ratio between the vitamin $B_{12}$ complex which is present and the saccharated iron oxide which is present in the final mixture is the determining factor. Thus, the vitamin $B_{12}$ concentrate can be of much greater or much less potency than that of Example 1 without impairing the stabilizing effect which is obtained, so long as the final ratio of the vitamin $B_{12}$ activity and the saccharated iron oxide falls within the range set forth above. Likewise, the stock solution of vitamin $B_{12}$ and the stock solution of saccharated iron oxide may be greater or less than those of Example 1 and the same stabilizing effect will be obtained by mixing proportionately different amounts of the two stock solutions so as to obtain the final desired ratio of the two active ingredients. From the examples it is possible to readily calculate the effective range of these active ingredients, but the examples set forth representative formulae.

The stabilizing effect of this invention is obtained irrespective of the particular source or the degree of purity of the vitamin $B_{12}$ concentrate or complex.

What is claimed is:

1. An aqueous composition containing vitamin $B_{12}$ and saccharated iron oxide in the proportions of 1 ml. of a solution containing 2 milligrams of a vitamin $B_{12}$ concentrate having a potency of 10.3 micrograms per milligram, and at least 0.1 ml. of a solution containing 20 milligrams of saccharated iron oxide per ml. of water.

2. An aqueous composition containing vitamin $B_{12}$ and saccharated iron oxide in the proportions of 1 ml. of a solution containing 2 milligrams of a vitamin $B_{12}$ concentrate having a potency of 10.3 micrograms per milligram, and from 0.1 to 4.0 ml. of a solution containing 20 milligrams of saccharated iron oxide per ml. of water.

3. An aqueous composition containing vitamin $B_{12}$ and saccharated iron oxide in the proportions of 1 ml. of a solution containing 2 milligrams of a vitamin $B_{12}$ concentrate having a potency of 10.3 micrograms per milligram, and 1.0 ml. of a solution containing 20 milligrams of saccharated iron oxide per ml. of water.

HELEN R. SKEGGS.

REFERENCES CITED

The following references are of record in the file of this patent:

Drug Trade News, vol. 25, page 35 (March 6, 1950).

Merck Index, 5th ed. (1940), page 293.